US008645203B2

(12) United States Patent
Bocheck

(10) Patent No.: US 8,645,203 B2
(45) Date of Patent: Feb. 4, 2014

(54) SYSTEM AND METHOD FOR FINDING POTENTIAL TRADING PARTNERS IN BOTH TWO-PARTY AND MULTI-PARTY SCENARIOS

(75) Inventor: Paul Bocheck, New York, NY (US)

(73) Assignee: JPM Global, Inc., New York, NY (US)

( * ) Notice: Subject to any disclaimer, the term of this patent is extended or adjusted under 35 U.S.C. 154(b) by 40 days.

(21) Appl. No.: 12/641,727

(22) Filed: Dec. 18, 2009

(65) Prior Publication Data

US 2010/0161597 A1 Jun. 24, 2010

Related U.S. Application Data

(60) Provisional application No. 61/138,586, filed on Dec. 18, 2008.

(51) Int. Cl.
*G06Q 30/00* (2012.01)
*G06Q 40/00* (2012.01)

(52) U.S. Cl.
USPC .......................................... 705/14.11; 705/37

(58) Field of Classification Search
USPC ................................................. 705/37, 14.11
See application file for complete search history.

(56) References Cited

U.S. PATENT DOCUMENTS

| | | | | |
|---|---|---|---|---|
| 5,727,165 | A * | 3/1998 | Ordish et al. | 705/37 |
| 6,847,938 | B1 | 1/2005 | Moore | |
| 2003/0014351 | A1* | 1/2003 | Neff et al. | 705/37 |
| 2005/0071244 | A1 | 3/2005 | Phillips et al. | |
| 2005/0251473 | A1 | 11/2005 | Viviani | |
| 2006/0026077 | A1* | 2/2006 | Silverman et al. | 705/26 |
| 2006/0080226 | A1 | 4/2006 | Pickering | |
| 2007/0124228 | A1* | 5/2007 | Elias et al. | 705/37 |
| 2009/0119223 | A1* | 5/2009 | Ourega | 705/80 |
| 2009/0271284 | A1* | 10/2009 | Arbib | 705/26 |
| 2010/0131383 | A1* | 5/2010 | Raghavan | 705/26 |

OTHER PUBLICATIONS

Abraham et al. "Clearing Algorithms for Barter Exchange Markets: Enabling Nationwide Kidney Exchanges". 2007.*
Ozturan, Can. "Computational Issues in E-commerce Trading Exchanges". 2002.*
Bravetti et al., "From Theoretical e-barter Models to an Implementation Based on Web Services", Electronic Notes in Theoretical Computer Science 159, 2006.*
Nishioka et al., "XML-Based e-Barter System for Circular Supply Exchange", DEXA'05 Proceedings of the 16th international conference on Database and Expert Systems Applications, Springer-Verlag Berlin, Heidelberg, 2005.*

(Continued)

*Primary Examiner* — Eric T Wong
(74) *Attorney, Agent, or Firm* — Lucas & Mercanti, LLP.; Robert P. Michal

(57) ABSTRACT

System and method for bartering items between two or more parties using a communications network in which each party accesses a central server via the communications network and provides a list of items they have to trade and want to obtain, a description of the items and any conditions for trade of the items. The lists are stored in a database and links indicating the party's possible trades are automatically created. A search for possible trades between the parties is undertaken using the links and the parties involved in each possible trade are notified to confirm the trade. Upon receipt of confirmation from each party, the trade is processed to completion. Weights may be assigned to the links, representing a degree of similarity between descriptions of items, whereby the search for possible trades is conducted based on the weights of the links.

19 Claims, 9 Drawing Sheets

(56) References Cited

OTHER PUBLICATIONS

Business Wire, ExchangeAnything.com Debuts Online Barter, Exhange and Donation Technology for Business and Consumer Community, Portal Sites (online), Apr. 4, 2000 (retrieved Feb. 22, 2008.) Retrieved from the Internet : URL: "www.allbusiness.com/technology/software-services-applications-electronic/6414759-1.html", p. 3, para 1, 2; p. 4, para 2,6. (15 pages).

United Parcel Service, Incorporated, UPS Exchange Collect (online), Nov. 7, 2005 (retrieved Feb. 22, 2008). Retrieved from the Internet: URL: "http://web.archive.org/web/20051107052040/http://ups.com/content/us/en/bussol/offering/global__transport/package/exchange__collect.html", Overview (2 pages).

Duckett, M.K., Mitchell Silverman, founder, Bookins.com (online), Industry Interview, Apr. 5, 2006 (retrieved Feb. 22, 2008). Retrieved from the Internet: URL: "http://bookins.com/bargainbooknews.php", Bookins membership is free, and it costs $3.99 to ship each book, correct? (4 pages).

* cited by examiner

SYSTEM AND METHOD FOR FINDING POTENTIAL TRADING PARTNERS IN BOTH TWO-PARTY AND MULTI-PARTY SCENARIOS

CROSS-REFERENCE TO RELATED APPLICATION

This application claims priority under 35 USC 119(e) of U.S. provisional patent application Ser. No. 61/138,586 filed Dec. 18, 2008, the entire disclosure of which is incorporated by reference herein.

FIELD OF THE INVENTION

The present invention relates generally to a method and system for finding potential barter transactions between two or more parties and more specifically, to a method and system capable of determining matches between two or more parties over a communications network such as the Internet.

BACKGROUND OF THE INVENTION

The Internet comprises a vast number of interconnected web servers and computers, which themselves are joined together by means of switches, routers, base stations, and gateways, that collectively enable transfer of packets of data between computers using various networking protocols such as a TCP/IP suite. The interconnected web servers and computers exchange information using various standard and non-standard services, such as electronic mail (or email), ftp, and the Hypertext Transfer Protocol (HTTP). In view of its open protocol nature, the Internet facilitates unprecedented instant interconnections between clients, companies, and governments that were not even dreamed of a decade ago.

With the invention of the Internet, new global business opportunities have surfaced. In view of its global nature, the Internet is especially useful for conducting electronic commerce.

Many web servers have been developed and utilized by vendors to advertise and sell products. The products can be tangible items (e.g., books, CD's, collectibles, etc.) that are delivered through conventional distribution channels (e.g., a common mail carrier), items that are delivered electronically to the purchaser over the network and/or Internet, or items that are electronically confirmed only (e.g., rights of use timeshare). Internet commerce does not only copy the brick and mortal storefront to extend its reach to global markets, it has also enabled the birth of new businesses that would not be possible to form without the capability of reaching millions of clients.

Besides a traditional Internet marketplace's sell and purchase transactions, a web server computer system may also be built to provide an electronic version of classified advertisements or classifieds. Such systems list items that are available for sale, purchase, and/or trade. In the past, classifieds were traditionally in print media at local newspapers or posted at, for example, local supermarkets or clubs. With the advent of the Internet, an electronic bulletin board and classifieds can grow to include clients outside of a local area.

For example, in a typical electronic bulletin board or classifieds model, a client who wishes to offer an item for sale may list one or more items he owns on the web site. This listing information may include, among others things, the seller's name, address, email address, and telephone number and possibly credit card number or other payment account if a listing fee is charged. Another client, who is a potential buyer, may browse through the electronic bulletin board using the Internet and a web browser and select various items that he wishes to buy. In one implementation, once the other client selects the items, the actual sale/purchase is accomplished outside of the electronic platform. In another implementation, when the client has completed selection of the items to be purchased, the server computer system then prompts the potential buyer for additional information, such as shipping information and a credit card number, in order to complete the trade. The server computer system then typically confirms the order by sending a confirming email to the client computer system and informs the seller to ship the item.

Although this traditional "electronic bulletin board" or "classifieds" model is very flexible and intuitive, it has several major downsides. It can facilitate a sale or purchase of items independent of each other only, but not for barter. In other words, only one transaction, sale, or purchase, at a time is executed. In addition, although some more advanced "electronic bulletin boards" allow clients to specify items for barter, they allow specifying only one item wanted for each item available. The inability to specify multiple "Want" items for each item listed makes trade transactions difficult to complete.

It is believed that existing "electronic bulletin boards" do not support trade or bartering between a plurality of clients and items. Most, if not all, such existing systems do not have any efficient automated matching capability to find potential trades. Although a manual search for potential trades involving only two participants is, in general, feasible, search for multiparty trades and coordinating of multiparty barter without automated tools is, at least, cumbersome. Since the overhead of searching for potential trade partners can be very high, a computerized barter matching system would be desirable for fast matching of trader's items without providing "repeated" information for each matching step.

Since assignment of multiple "Want" items is accomplished during an initial description of the item available, the assignment of multiple "Want" items for this one particular item available is initially declared as the "default" assignment or "link". However, during each individual client's session in which the client is using the system to match his items for trade, the client may temporarily decide to change "Want" items for his item available. In other words, if default linked "Wants" can be temporarily changed for the duration of the matching session, clients will be able to find other potential trades that would not be available if the default link assignment is used. Therefore, it is desirable to enable clients to further modify assignments of multiple "Want" items for each item listed during the time the client is engaged in online matching activity.

If, during the session of finding the trading partners for items available, the match results are not found, the clients may be interested in finding at least the (i) clients who want their item and/or (ii) clients who have what the client wants for his item. A system is therefore needed to allow clients to find one or more matches for their available items as well as to provide a list of clients or items available for trade that do not match client's "Want" list thus allowing the client to initiate the trade with an unwanted item or offer the different item for the wanted item.

In a typical electronic bulletin board, the client, who is a potential buyer, has limited search capabilities for items he is interested in acquiring. A returning client, typically regarded as a "guest" until log-in, cannot search for items he is interested in without specifically describing search conditions each time they are conducting a search. A system would therefore be desirable that allows clients to find one or more matches for items of interest without logging into the system by automated means thereby offering the client potential matched trades in a batch mode, for example, once a day, once a week, etc.

Although the matching system utilizing the detailed description and categorization of items available for trade and items wanted can provide adequate "suggestions" as to potential trades available, the matching system may further be augmented with information about the client's behavior as it relates to his current and/or past trading activity. The information about the client's trading behavior may be beneficial in the selection of potential trading partners. It would therefore be desirable to enable the system to allow utilization of clients' trading behavior in order to find eventual trading partners for items available and items wanted.

The above-mentioned methods that allow traders to save time and money by shortening the process of finding potential trades clearly constitute an important enabling factor for further advances in eCommerce. As described more fully below, the present invention improves the prior art eCommerce or Internet-based barter systems by proposing, among other things, a system that automatically matches potential trade partners that are likely to agree with a barter transaction. It would therefore be of great interest to eCommerce participants to use systems that embody the present invention while trying to improve their efficiency and profitability.

OBJECTS AND SUMMARY OF THE INVENTION

The invention describes methods and the system that allow parties to effectively find trading partners in a computerized classifieds listing system over a communications network such as the Internet.

It is an object of the present invention to provide a new method and system for finding "matches", e.g., potential barter transactions between two or more parties each having one or more items available for barter and one or more items wanted for each individual item available.

It is another object of the present invention to provide a new method and system capable of finding multi-party "matches", e.g., potential barter transactions between three or more parties over a communications network such as the Internet, which in some cases, overcomes deficiencies of current barter systems.

It is another object of the present invention to provide methods that increase both the accuracy and scope of match results thus allowing parties to find other barter alternatives.

In order to achieve one or more of these objects and possibly others, one embodiment of a method and system in accordance with the invention involves a computerized classifieds listing system for implementing and coordinating cashless barter between a plurality of trade parties each having one or more items available for barter, via one or more communications networks, preferably the Internet. In particular, the method and system enable a description of items offered for barter to be provided over a communications network, for efficient browsing and search within a barter database, for an automated matching and for creating potential two-party (2P) and multiparty (MP) trades.

In one embodiment, clients using the system and method enter data describing items they offer for barter, items they are willing to accept, and criteria regarding the trade, from the client's system to a central barter database residing, for example, on a central computer. In particular, they can describe items they offer for barter and items they are willing to trade without reference to other items in the database or by reference to items available for trade and items wanted.

BRIEF DESCRIPTION OF THE DRAWINGS

The principles of the invention may be fully understood by reference to the following drawings, illustrating several embodiments of the present invention. Also, the invention may best be understood by reference to the following detailed description of and illustrative embodiment when read in conjunction with the accompanying drawings, wherein.

DETAILED DESCRIPTION OF THE INVENTION

Figure 1:
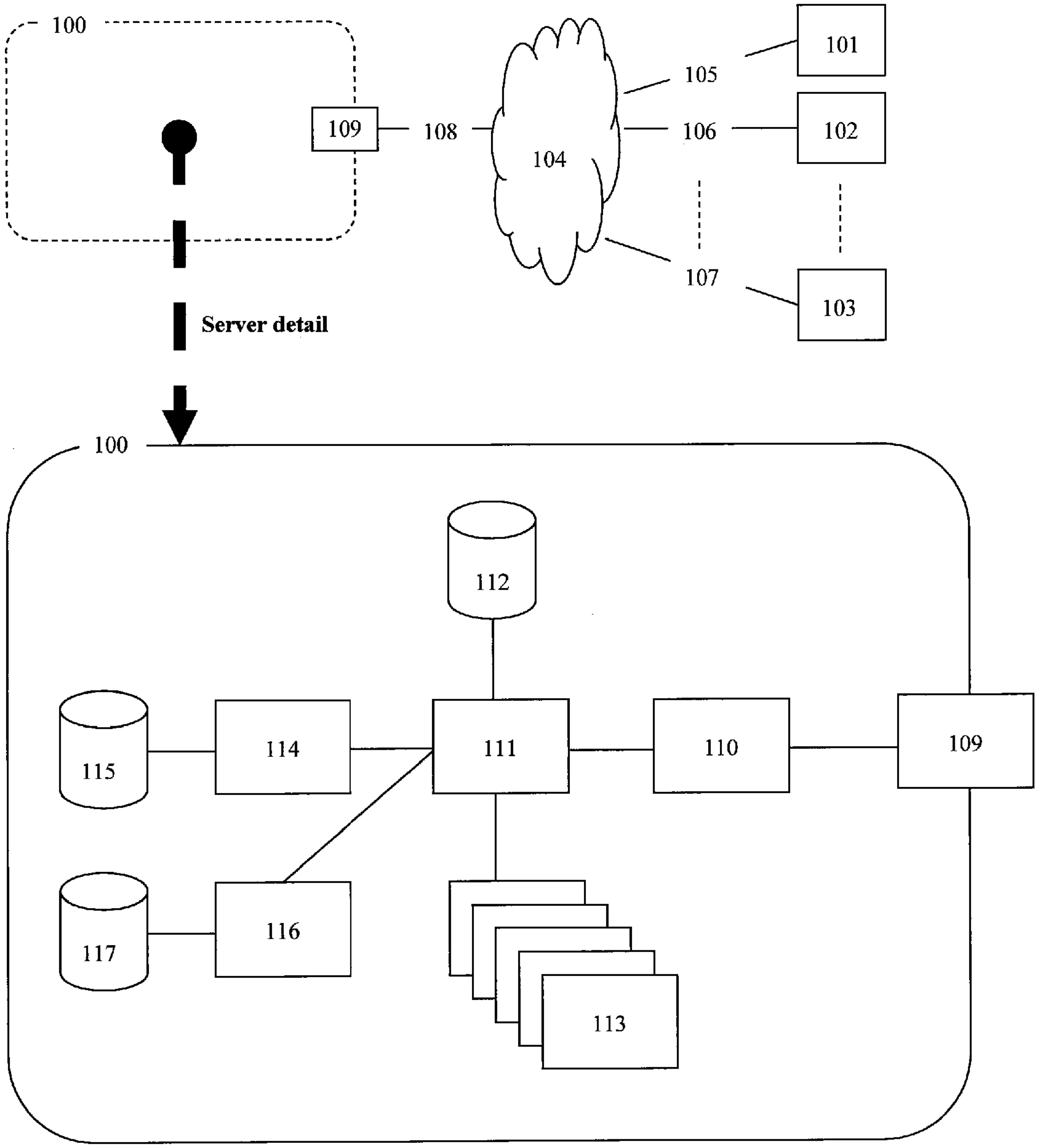
FIG. 1 shows a general architecture of the barter system in accordance with the invention.

Referring to the accompanying drawings wherein the same reference numerals refer to the same or similar elements, an exemplifying embodiment of the present invention comprises a method and system for finding an optimal match, or set of matches (which may be one or more matches or a plurality of matches), between two and multiple barter items or offers, via one or more communications network, each of which may be, for example, the Internet, a mobile network, or wireless network. A preferred embodiment of the invention relates to the use of the foregoing in conjunction with a computerized classified listing system.

Initially, it is emphasized that the invention is not limited to bartering scenarios between two parties, but can be used for arranging exchanges between multiple parties, i.e., three or more parties. The items bartered may represent virtually anything including a wide range of collectibles, tangible goods, services, rights of use and real estate. The invention also assumes that in a preferred embodiment, two-party and multiparty barter is supported between non-like (dissimilar) items or items from different categories. In general, the present invention can be applied any time one or more items are exchanged.

FIG. 1 shows a general architecture of the invention represented by a central server 100, N trader terminals 101, 102, . . . , 103 connected to the central server 100 through one or more networks 105, 106, . . . , 107, 108, or the Internet 104, and one or more network interfaces 109.

The general architecture is shown in FIG. 1 for illustration of how an exemplifying embodiment of the present invention can be realized and deployed. In a preferred embodiment, the invention is implemented as a collection of one or more web servers 110, application servers/processors 111, 114, 116, and databases 112, 115, and 117 thus taking advantage of the global Internet's access spanning across the world. Traders are able to communicate via their terminals 101, 102, . . . , 103 with the central server 100, i.e., the one or more web servers 110, by means of web browsers that display HTML web pages 113 delivered from the central server 100 by, for example, HTTP protocol. The web site design and implementation can vary widely; however, it is assumed that the website provides, at a minimum, web pages for clients to be registered, sign in or log in, for adding items to be offered for barter with accompanying trading information to a barter database, and web pages for browsing, searching and updating the barter database. The website shall be able to display, among other things, detailed information about items in the barter database, information about traders, status about their account, their address, and shipping address, information about availability of items for exchange and results of the system's online and offline auto-matching algorithm suggesting potential trades between clients (described below). In addition, the website should be able to display a user interface enabling clients to link their items for trade with their items wanted.

Application processor 111 can be programmed, i.e., include and/or access one or more computer programs embodied on computer-readable media, to coordinate a trading logic between clients and to maintain a database of registered client's current trading status. Benefits for clients to register to use the system may include, for example, the ability to create any trade offers in any of the ways described below. Non-registered clients may still be provided with the ability to use the system, i.e., unrestricted browsing and searching for items, but, in one embodiment, they will not be able to search for potential trades using automated matching algorithms, or create trade offers. In another embodiment, non-registered clients will not be able to view other registered client's trading status and personal profile. Registration may be for free or for payment or for other consideration. Also, use of one or more security features to ensure each trader's actions, such as use of a password, is envisioned.

Server 100 employs or accesses one or more databases 112, each containing (i) barter listings with links between items offered in trade and items wanted, (ii) barter offers and their status, and/or (iii) a barter archive containing all previously posted, but not longer active barter listings, offers, and trades. A barter listing is created by a trader and contains one or more descriptions of items offered for trade (hereinafter referred to as "Haves") linked to one or more items the trader is willing to accept in trade ("Wants"). The more "Wants" the trader enters to the system that they are willing to accept in trade, the more likely a trade will be matched and eventually completed.

In particular, the barter listing is created by a plurality of parties at a client system or their terminals 101, 102, . . . , 103, received by the server 100, and posted to the barter database 112. In one embodiment, a barter listing is formulated by designating a selected quantity of the Item A to be offered, designating a "suggested value" of the Item A to be offered, designating a selected quantity of the plurality of items B to be acquired, trader's shipping information for the items to be acquired, and the trader's payment information. In a preferred embodiment, for each Item A offered, there will be designation of a plurality of items or categories of Items B sought to be acquired. Designation of a plurality of items sought to be acquired serves to increase the probability of a successful barter match. Preferably, there will be a plurality of barter listings entered by each trader.

In a preferred embodiment, all items are described in tree-like fashion, where each branch represents categories and subcategories and leaves represent actual items. Each item is designated by a root category, for example goods (collectibles, CD's, . . . ), services, right to use, and real estate. In addition to assigning the item to an appropriate category or subcategory, the item can be further described by a set of applicable attributes that are associated with that particular category or subcategory. For example, the item may be described by attributes named "condition" or "color".

In one embodiment, some attributes, such as "title" or "condition", may apply to more than one or all categories or subcategories. Attributes itself may be of different data types, for example, alphanumerical, numerical, textual, and boolean. When searching or matching, the type and operation characteristics of attributes will influence the final result. In a preferred embodiment, the client will be able to select a plurality of attribute values by logical operation such as "equal to", "less than", and "more than" and/or be able to select values individually. For example, clients should be able to select plurality of computer peripherals that are included in the laptop offered for trade or wanted by selecting "DVD drive", "Flash drive", "Floppy", etc., check boxes, or selecting their requirement of "more than" 2 GB of main memory. The same attributes options shall be available for keyword and advanced search.

In a preferred embodiment, the server 100 employs one or more application servers/processors 114 and 116 with databases 115 and 117 respectively. When a barter listing is created and posted to the database 112, it is also entered into databases 115 and 117 by application servers/processors 114 and 116 respectively. In one embodiment, the application server/processor 114 is programmed, via one or more computer programs embodied on computer-readable media, to enter the information into the database 115 in accordance with optimal structure required for fast natural language search and retrieval. In addition, the item entry is created in database 117 by application processor 116. Application processor can be programmed, via one or more computer programs embodied on computer-readable media, to provide matching capability as related to each item or set of items and their linked "Wants".

In a preferred embodiment, the application server/processor 114 employs a trading algorithm that coordinates trading activity between clients. When a trade offer is created by a trader, or by the barter system, traders have an option to accept the trade at the client system by selecting an "Accept" button (link) that sends an Accept message to the server 100. If, within the known default time period, the server 100 receives confirmations from all involved traders, a computer program at the server 100 combines trades from the trader's with each other trader's identification, payment, and shipping information to generate an order to complete trades between multiple parties in accordance with billing and shipment information whereby each trader effects the trade completion by selection an "Accept" trade button. All involved parties will then be notified by the server 100 sending a "Confirm" message with details how to arrange for shipment of the items involved in the barter transaction.

[Have-Want Relationship]

In a preferred embodiment, in addition to enabling creation of links between only two items, i.e., an item available for trade and an item wanted to be acquired, it is possible to create a link between a single item a trader has available and a plurality of items a trader seeks (for example a group of similar items), a link between a single item a trader seeks and a plurality of items a trader has available, a link between one of a plurality of items a trader has available and a single or one of a plurality of items a trader seeks and/or a link between one of a plurality of items a trader seeks and a single or one of a plurality of items a trader has available. Each link will be permanent until items are de-listed which would prevent the link from having an item available for trade and an item wanted to be acquired. If a feature "Match Boost" is implemented, the permanent link will become dynamic and its weight may be modified. A detailed explanation of this feature is described below.

Figure 2:
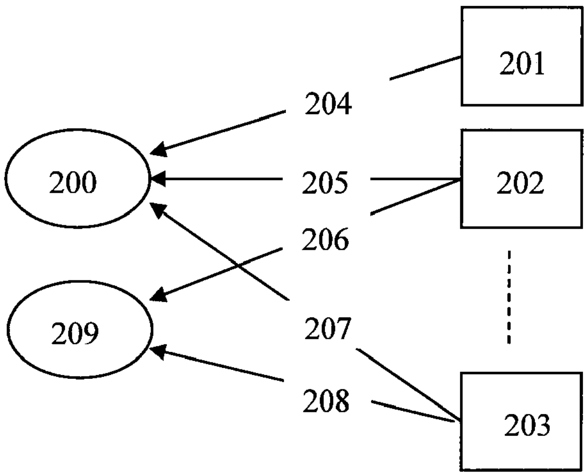
FIG. 2 is a diagram showing a Have-Want relationship in accordance with the invention.

An example of this preferred relationship between one or more items available for trade ("Haves") and items wanted ("Wants") is depicted in FIG. 2. "Haves" are those items the client offers in trade and "Wants" are those items the client wishes to obtain. Want items 201, 202, and 203 are linked to Have item 200 by links 204, 205, and 207 and Want items 202 and 203 are linked to Have item 209 by links 206 and 208. The relationship between client's Haves and Wants can be non-existent, partial or create a complete mesh, e.g., each Have item is linked to all Want items. In reality, linking of Haves and Wants represents each client's individual trading preferences. The links 204, 205, 206, 207, 208 are called "default" since clients assign those during the initial creating of the listing of Haves or Wants, and/or during the following editing of those items. Default links can be augmented by temporary links as explained below in connection with the "Match Surf" feature.

Figure 12:
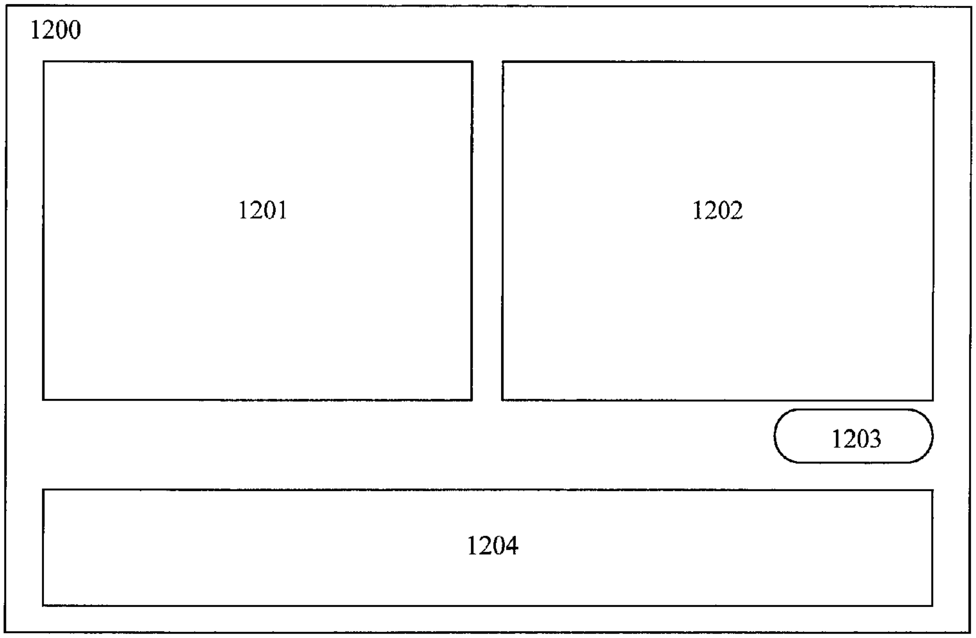
FIG. 12 shows a user interface of a Have-Want relationship assignment in accordance with the invention.

FIG. 12 depicts a web interface 1200 used by clients to create default links between Haves and Wants. Web interface 1200 comprises three areas. In one embodiment, the first area 1201 is used for selection of each client's Have item. When the client selects the Have item from the list of all his items available, the second area 1202 displays a list of all of the client's wanted items. The client may choose to select one or more items he wants to "link" to this item. The actual linking may be accomplished, for example, by clicking on button 1203. In another embodiment, the first area contains a list of all items the client wants and the second area contains a list of all items available. The client can link his wanted items to one or more items available by, for example, clicking on button 1203. The area 1204 contains a list of all Haves and currently linked Wants and/or a list of all Wants and all currently linked Haves.

[Instant Match]

Figure 7:
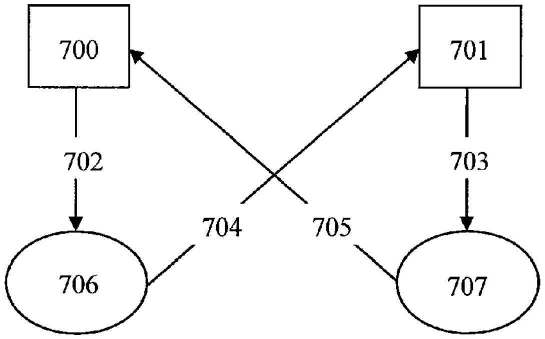
FIG. 7 is a diagram showing a "2P Match" feature in accordance with the invention.

FIG. 7 depicts the "Instant Match" feature of the current invention as it applies to two-party trades. A trader having an item 706 and willing to exchange it for an item 700 may be matched to a trader having an item 707 and willing to exchange it for item 701. The Instant Match is depicted by a "trading circle" that is formed by two item transfers 704 and 705 that represent a "similarity" between items available for trade 706 and wanted item 701 and item available for trade 707 and wanted item 700 respectively. The "trading circle" can be defined by an ordered list of Haves, Wants and their connections. The example of the match depicted on FIG. 7 can be written as an ordered list starting from item 706: 706, 704, 701, 703, 707, 705, 700, 702. Note that links 702 and 703 represent "default" links between client's Have and Want items while links 704 and 705 represent a "similarity", e.g., item transfers between different trading partners. In a preferred embodiment, both links, Haves, and Wants are assigned a numerical rank value in the range from 0 to 1 that represent the level of "similarity or likeness" between descriptions of Haves and Wants or a "level" of detail description of Haves and Wants.

However, limiting the potential trades on bartering between two traders is a significant restriction, and may be eliminated in some embodiments of the invention. In the case of buying/selling using money, the assumption of two-party transactions is valid because it is possible to use money to offset one side of the transaction. However, in cashless bartering, it is not always likely that a match is going to be found. Therefore, in a preferred embodiment, the invention will accommodate multi-party matching between a plurality of items owned by individual traders. In this case, adding more traders and items to the trade can improve the global satisfaction of all traders, because, if independently paired, their trade requirements would not be possible to match satisfactorily and the probability of a trade not going through would increase.

Figure 8:
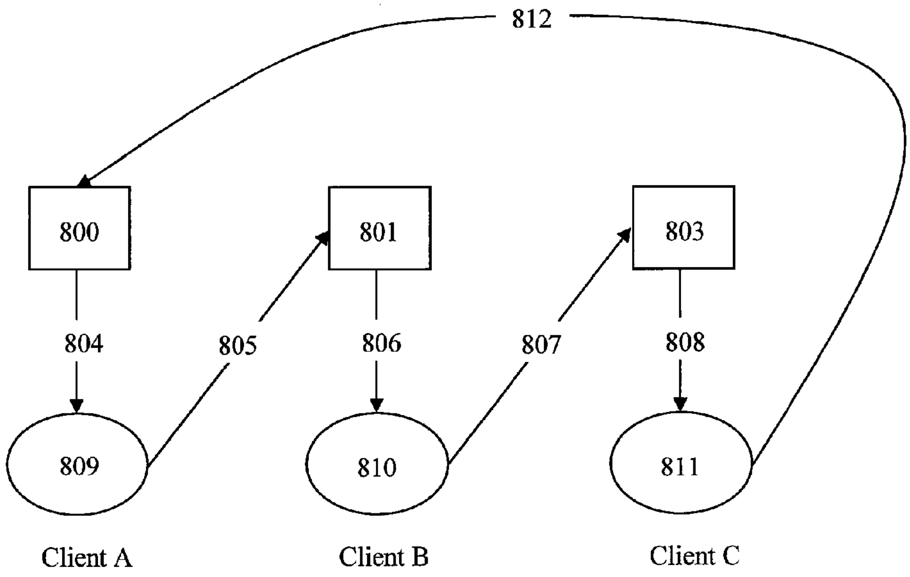
FIG. 8 is a diagram showing a "MP Match" feature in accordance with the invention.

FIG. 8 depicts an "Instant Match" feature of the current invention as it applies to multi-party trades. The three traders A, B, and C are depicted each having items available for trade 809, 810, and 811 and wanted items 800, 801, and 803, respectively. The multiparty "trading circle" can be written as an ordered list starting from item 809: 809, 805, 801, 806, 810, 807, 803, 808, 811, 812, 800, 804. Note that links 804, 806, and 808 represent "default" links between client's Have and Want items while links 805, 807, and 812 represent item transfers between Have and Want items of different clients.

When the trade listing is created by client A and entered into the barter database 112, it is also submitted to application server/processors 114 and 116. The application server/processor 114 analyzes the listings and determines the "similarity" of items offered and wanted for the presence of potential barter trades involving, three or more parties in the case of a multi-party trade or "trading circle." In a preferred embodiment, application server/processor 14 is considered a barter processor that comprises several servers. While utilizing natural language processing (NLP) algorithms, a "similarity rank" based on "likeness" of an item offered for trade and "likenesses" of items wanted and already in the barter database is computed. In addition, "likeness" of an item wanted and "likenesses" of items offered in trade are computed as well. Barter processor 114 is provided with or enabled to access one or more computer programs embodied on computer-readable media to effect these functions.

The item transfers, including those items with similarity rank exceeding a given threshold, are collected in the database 115 and processed by application server/processor 116, which may be considered as a match processor. The match processor executes intelligent graph search algorithm embodied in computer-readable media that is part of the current invention to find matches, e.g., potential trades based on item transfers, default and dynamic item links. The match result is formed when item transfers and item links form a closed loop, called a "trading circle". The match processor can be directly queried by clients over the network from "Instant Match" or "Match" web pages. Traders will have an option to send trade offers right after they list an item for trade. In a preferred embodiment, the barter and match processors employ secondary databases 115 and 117 of listings to thereby optimize storage for efficient search and natural language processing (NLP) and tree search algorithms.

Figure 14:
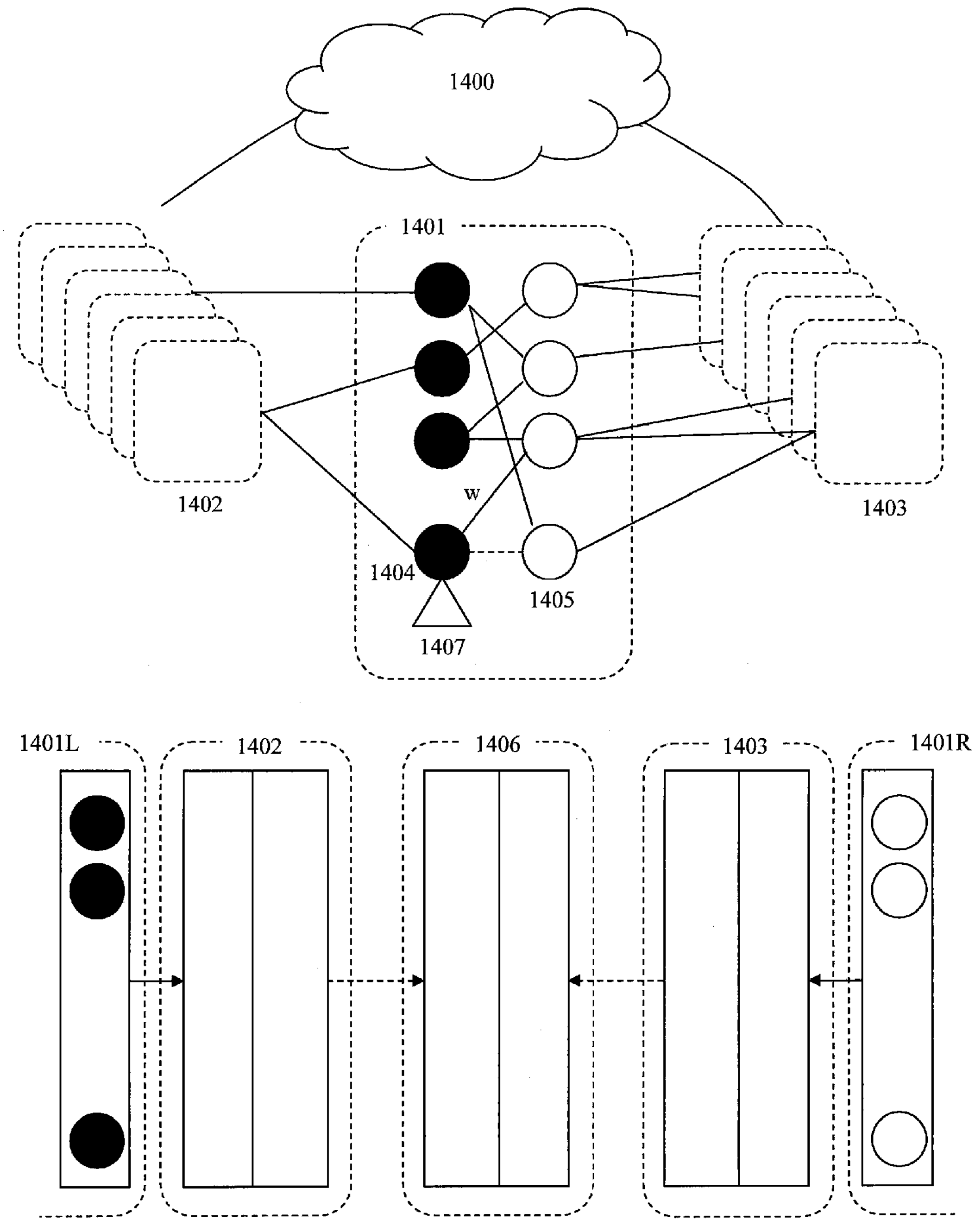
FIG. 14 is a diagram showing a "Matching engine" algorithm in accordance with the invention.

FIG. 14 depicts a schematic diagram of the match processor's operation. Network 1400 represents a collection of client's nodes 1401, 1402, . . . , 1403. Each client node contains a number of vertexes, one for each client's item. There are three types of client vertexes: Type I, Type II, and Type III.

Type I vertex 1404 relates to the item that is available for trade and Type II vertex 1405 is related to the item wanted. Type III vertex 1407 is a "virtual" vertex not related to any item listed. Each Type I vertex is connected to one Type III vertex 1407 by a directional edge from Type III vertex to Type I vertex. Each vertex may be assigned a specific weight. In a preferred embodiment, this weight may be in range 0 to 1 and corresponds to the completeness of the item's description.

In node 1401, vertexes are interconnected by directional edges from Type II to Type I depending on default links selected by the clients. In a preferred embodiment, each edge may be assigned a weight w in the range from 0 to 1. In another embodiment, each link is assigned a weight equal to 1 if the client links his Type I vertex and Type II vertex, otherwise the edge's weight is set to 0. In yet another embodiment, the edge may be removed if its weight is set to 0.

Nodes 1401, 1402, . . . , 1403 are interconnected by directional inter-node edges. The connection between nodes is accomplished from within the nodes by the edges directed from Type I vertex to Type II vertex. In a preferred embodiment, inter-node edges may be assigned a weight in the range from 0 to 1. The weight represents a "similarity rank" between descriptions of items available for trade and wanted items.

A goal of the matching system is to find route between one or more Type I vertexes and one or more Type II vertexes. In one embodiment, the length of the route may be limited to four or six vertexes, representing a two-party or three-party match, respectively. However, the current invention does not require any restrictions on values or specific parameters used in any particular implementation. All routes that are found by the matching algorithm are then sorted by route rank. In general, route rank will be computed as multiplication of all weights assigned to edges and vertexes multiplied by a coefficient depending on the length of the routes. A sorted list of routes is then presented to the clients as a match result.

In a preferred embodiment, a more efficient computation is accomplished using limits or bounds on minimum route weight and/or minimum and maximum length of the route. FIG. 14 further depicts a diagram of the matching algorithm. The execution starts from the node 1401 in the direction that has least number of items (from 1401L and 1401R) from Type I vertex, and Types II and III vertexes. In each iteration, a new list of potential vertexes is created by traversing edges connecting adjacent nodes. The list containing the least number of items is selected and the computation is repeated. At each stage, the new item list and route is collected from the adjacent nodes 1402 and 1403. In one embodiment, any route that does not satisfy the route rank limit or bound will be discarded.

In another embodiment, different routes to the same vertex may be discarded in favor of a route with the highest rank, or only specific number of nodes can be retained and the rest discarded. In yet another embodiment, a limit or bound on number of nodes at each level may be placed. At each iteration stage, a check is made if any of the vertexes on the left or right lists are connected through item links. If they are, the result is marked as a match. After reaching pre-determined number of iterations, all marked matches are ordered according to the route rank and returned to the client as potential matches.

The matching system takes into account risk associated with the probability of a successful trade between multiple trade parties. If a multi-party circle is formed comprising multiple traders, it is assumed that a trading circle with a lower number of parties will have a higher probability to be completed. This relationship is represented by a route multiplication coefficient that decreases with the route length.

[Smart Pick]

When a new barter listing is entered to the barter database 112, the server system can be arranged to display a few potential listings that match the listing just created. In this manner, the trader has an opportunity to create a barter offer and initiate a trade right after submission of the listing simply by selecting one of the matched listings. If the trader does not like to send a barter offer for one of the displayed items, he can continue to see all matches by selecting a "match" link.

In one embodiment, the computation of trade matches can be triggered asynchronously, for example, in batch mode. In this case, when a matching engine finds a trading circle satisfying a predefined "likeness" threshold condition, i.e., having a similarity measure above a predetermined threshold, the application server 111 sends a message to all participating traders associated with the trading circle. When each client receives the message, the client can display the message if it is in the form of an HTML document identifying the complete trade or the client can request that document by clicking a link within a message if the message is an email. In one embodiment, it may be necessary to log-in to the barter server to view the complete trading circle.

[Incomplete Match]

Although a primary function of the matching engine is to find matches or "trading circles", it can also help in the identification of other potential trades. There are two potential trade lists that may be suggested to the clients. The first list contains items that the client can obtain in trade for the item available, although those items are not what the client wanted. The second list contains items the client wanted, although the client's item available is not wanted by the owner. In both cases, the items on the list have at least one linked item associated with them.

There are two types of "Incomplete Match" feature lists, type A and type B. In type A, the client is presented with the list of items that when selected by the client as the items wanted in exchange to the item available, a trade offer may be formed. The trade offer may be two-party or multi-party. In type B, the client is presented with items that are "similar" to the item the client wants, however the client himself does not have an item the other client wants for those items. The client may initiate the trade offer by selecting an item for the list of his items, possibly the one that the other client wants.

Figure 9:
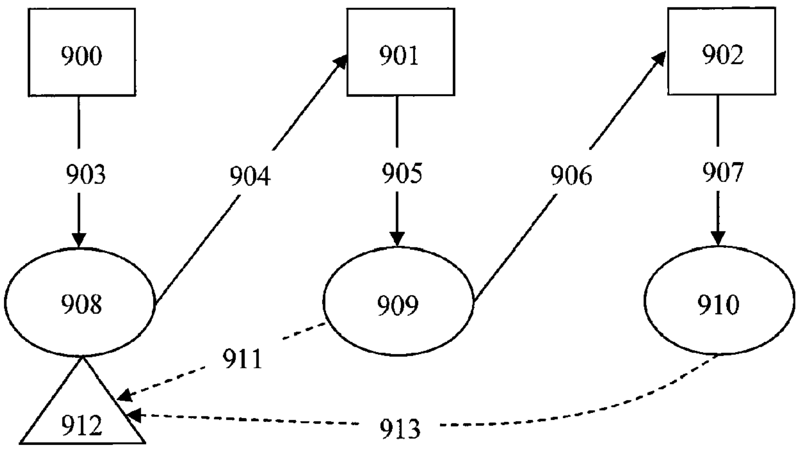
FIG. 9 is a diagram showing an "Incomplete Match" feature in accordance with the invention.
Figure 10:
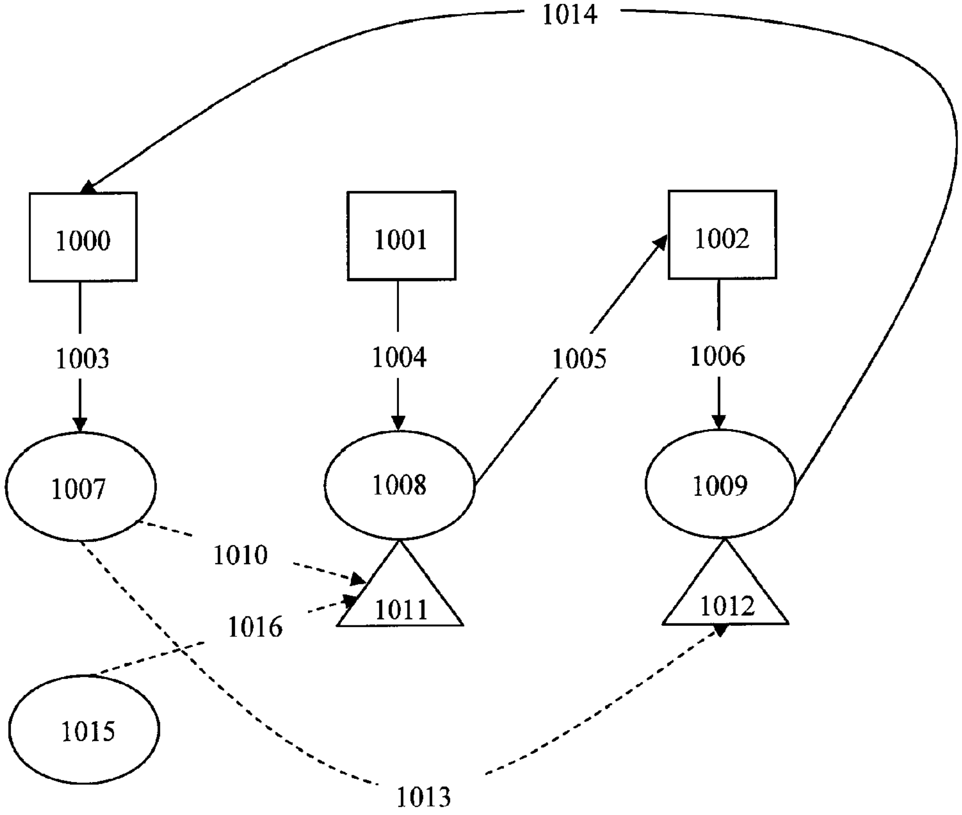
FIG. 10 is a diagram showing an "Incomplete Match" feature in accordance with the invention.

FIGS. 9 and 10 depict diagrams of preferred embodiments of the "Incomplete Match" feature. The Type A "Incomplete Match" is depicted in FIG. 9. Three clients, each having one Have and one Want item are shown. The first client has item 908, linked to Want item 900; the second client has item 909, linked to Want item 901; the third client has item 910, linked to Want item 902; and default item links are depicted as 903, 905, and 907 while item transfers are 904 and 906. In this particular example, a match cannot be found. However, the first client can be presented with choices to receive items 909 or 910 in trade for his item 908 if he agrees to accept the item 909 or item 910 for his item 908. This is graphically represented by the client's "virtual" Want item matching any selection or item 909 or 910. If the client selects item 909, two-party trade can be started while if he selects item 910, three-party trade can be started.

The Type B "Incomplete Match" is depicted in FIG. 10. Three clients, each having one Have and one Want item are shown. The first client has two items. The first item 1007 linked to Want item 1000 and the second item 1015 is not linked to any of his Wants. The second client has item 1008 linked to Want item 1001 and the third client has item 1009 linked to Want item 1002. Default item links are depicted as 1003, 1004, and 1006 while item transfers are 1005 and 1014.

Items 1011 and 1012 represent virtual Wants for Haves 1008 and 1009, respectively. Similarly, as in the previous example, a match cannot be found since the trading circle is not formed. However, a two-party or multi-party trade can be started if either clients having items 1008 or 1009 accept Have item 1007 in exchange for their items. In other words, if the clients B and C do not have Wants that match the description of item 1007, the trade can be starter only if the item 1007 is offered without a match, as depicted by item transfers to virtual Wants 1011 or 1012. If the item 1007 is offered to client having item 1008, a three-party will be started. If item 1007 is offered to client C, a two-party trade will be started. As an alternative, client A can offer any of his other items available, for example item 1015 to create a trade as depicted by virtual item transfer 1016.

[Instant and Incomplete Match Web User Interface]

Once populated by a plurality of barter listings, the barter databases are available for browsing, searching, and matching by traders from their client systems or terminals. In one embodiment, the server system uses a matching processor to match individual barter listings and barter offers between pluralities of parties in such a way that two-party and multi-party trade matches can be identified. Retrieval of matched listings and items is triggered by a request from the client system using a "match" method on a web page for one or a plurality of their "Haves" or Wants." The trader can initiate matching by selecting an item available for trade on the Instant Match web page. When invoked this way, the matching engine assumes that only default links as entered in the listing are used for finding matches. The client can retrieve matches for different listings by clicking on, for example, a link or icon representing the other item available. From resulting matches presented to the trader at the client system or terminal, the trader then selects one or more trades to view details about the items or to send a trade offer.

Figure 13:
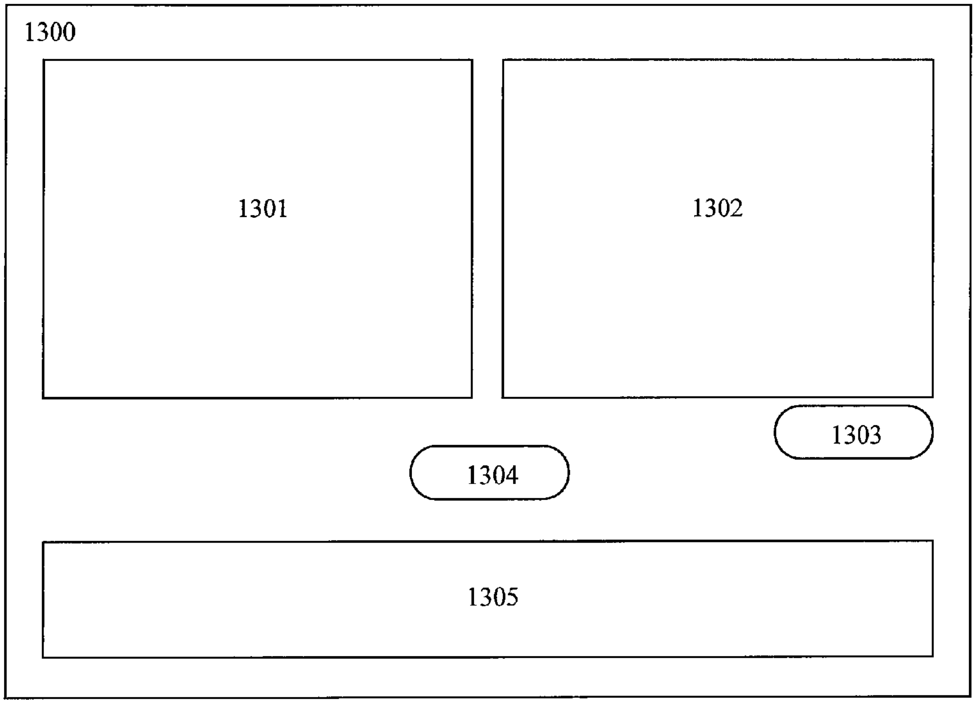
FIG. 13 shows a user interface of a "Matching engine" feature in accordance with the invention.

FIG. 13 depicts an exemplifying match web interface 1300 used by the client to find matches for his items available. In part 1301, the client selects one of his items available from the list of his Haves. When selected, the area 1302 then displays the selected item's default linked Wants. The client finds a match by clicking on, for example, button 1304.

The match results are displayed in area 1305. The area 1305 may contain several types of results. In one embodiment, it may display two-party and multi-party matches only. In another embodiment, it may display, in addition to two-party and multi-party matches, also Incomplete Matches. In a preferred embodiment, both Instant Match and two types of Incomplete matches will be shown along with regular Instant Matches.

In yet another embodiment, the client may select one or more Have items and one or more Wants, instead of only one Have and one or more Wants before invoking the Match execution.

[Match Surf]

Figure 11:
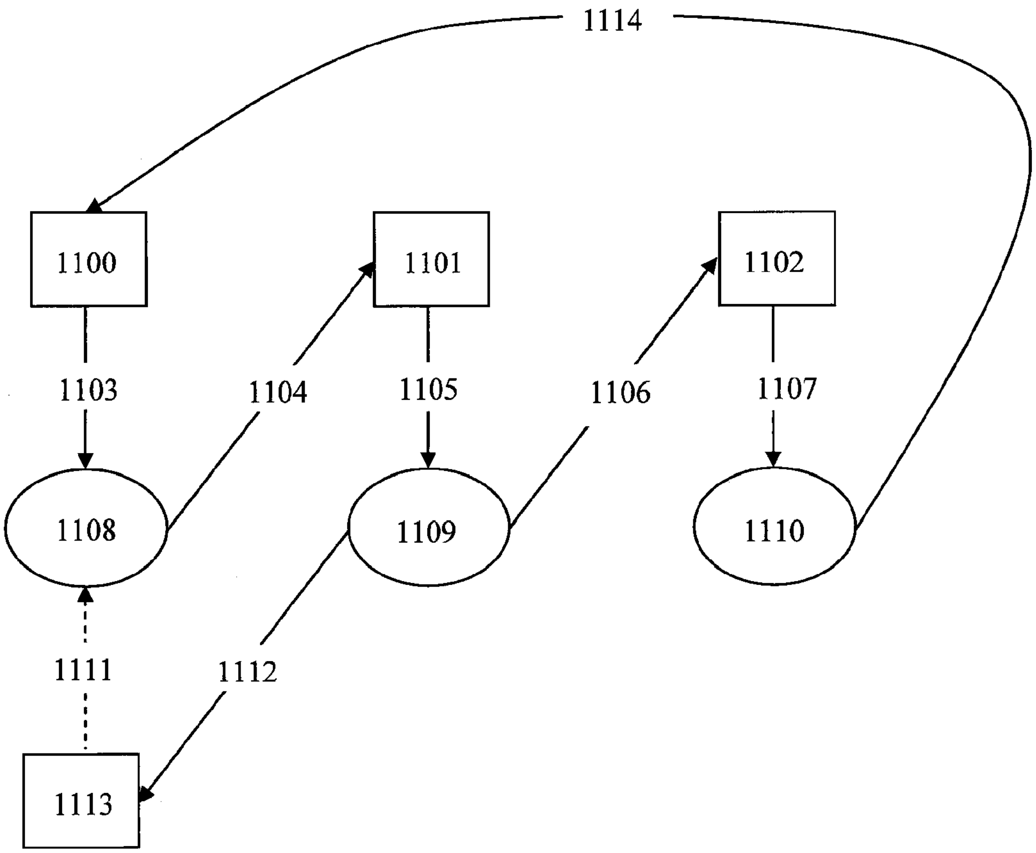
FIG. 11 is a diagram showing a "Match Surf" feature in accordance with the invention.

FIG. 11 depicts a diagram of another feature of the current invention called "Match Surf". In a preferred embodiment, retrieval of matched listings is triggered from a Match web page with the "Match Surf" feature. The "Match Surf" feature allows the client to modify, before the submission to the matching processor or matching engine, their listings by linking or unlinking additional "Wants" for each item offered for trade. By temporarily linking or unlinking the "Wants", the client can "broaden" or "filter" his match results respectively.

FIG. 11 depicts three clients having one item available for trade and one item wanted. Client A has the Have item 1108 and the Want item 1100, client B has the Have item 1109 and the Want item 1101, and the client C has the Have item 1110 and the Want item 1101. Default item links are represented by connections 1103 (client A), 1105 (client B), and 1107 (client C). Further assume that Have and Want items form a trading "circle": starting from item 1108: 1108-1104-1101-1105-1109-1106-1102-1107-1110-1114-1100-1103. This match results from client A's selection of a desire to trade his Have item 1108 for his Want item 1100. Now assume that client A has another Want item 1113, not linked by default to the item 1108. However, for the duration of this match session, the client may choose to temporary link the Want 1113 to Have item 1108 and re-submit the request for computation of the match between his Have item 1108 and his Want items 1100 and 1113. Now, because of the additional temporary assignment, two matches will be returned: one will be the match returned previously and the other will be the match described by the following match: 1108-1104-1101-1105-1109-1112. While the former match is three-party, the latter match is two-party. In another embodiment, the client may de-select one or more his Wants to filter his results to include only results matching their Have and Wants.

FIG. 13 can also depict the "Match Surf Web Interface" 1300 used by the client to find matches for his items available. In area 1301, the client selects one of his items available from the list of his items. Then, the area 1302 displays the selected item's default links. To use the Match Surf feature, the client may choose to select additional Want items or de-select their "default" Want items in area 1302. In this manner, the client is able to create temporary dynamic links between their Have and Wants. The match result is retrieved by clicking on, for example, match button 1304 that causes results to be shown in the area 1305. In one embodiment, button 1303 may be used to force the temporary assignment to be "default".

[Match Boost]

The probability of a successful trade may be increased by using the history of clients' trades and offers. By using the same set of matching algorithms, the barter engine's matching subsystem may operate on different data sets. In a preferred embodiment, each time the client sends a trade offer, the system creates or modifies a weight of a directional link between two items indicating that the client wants somebody's item. This link will be permanent until any of the two items are de-listed. This invention is instrumental in providing efficient two-party and multi-party matching. In essence, this newly formed or modified link indicates a willingness of the client to acquire another client's item thus increasing the probability of completion of a barter trade (because the trader manually selected the actual trade).

"Match Boost" is an important feature to support multi-party trades in that each time a trader sends a trade offer, by default, they have identified an item or items that they want. As links will be assigned, a weight coefficient expressing similarity of descriptions or likelihood of match is assigned and those created by sending offers will have, in general, a higher value than those computed using natural language processing (NLP) algorithms. It is therefore possible to create a plurality of weighted "virtual links" between descriptions of "Haves" and "Wants." Links between items the client wants and items others have form a connected graph that the matching engine can use to compute "trading circles," e.g., possible or potential barter trades, which are discussed more fully below. Basically though, using links between items, a barter system's match subsystem in accordance with the invention can form a circle of traders and their items to be traded so that one trader may obtain an item from another trader with that trader obtaining an item from yet another trader, and so on, until all traders can be provided with what they seek in exchange for what they are willing to offer. All members in those "trading circles" will be notified by the match subsystem and invited to trade.

FIGS. 3-6 depict diagrams of several variants of the "Match Boost" feature. The "Match Boost" feature is based on "virtual items" (TYPE III vertex). Functionality of this feature can be best explained in an example involving two-party trades; the extension to multi-party trades can be easily inferred from this two-party example.

Figure 3:
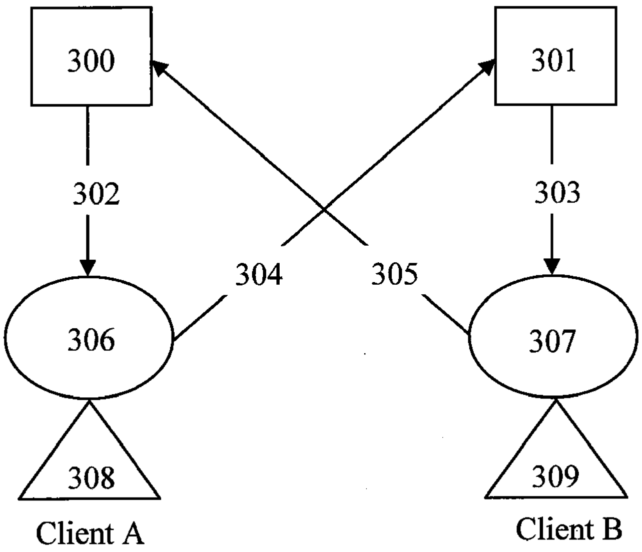
FIG. 3 is a diagram showing a "Match Boost" feature A in accordance with the invention.

FIG. 3 depicts an example of two-party match. Client A has one item available for trade 306 and one wanted item 300. Client B has one item available for trade 307 and one wanted item 301. The items 308 and 309 depict "virtual" items that are appended and linked to every item available by virtual link with a weight that equals one. The link 302 connects client A's items while the link 303 connects client B's items. The item transfers 304 and 305 complete the "trading circle" as computed by the matching subsystem. Weights of links 304 and 305 depend on the "similarity" of the description of items 306 and 301, and items 307 and 300. In a preferred embodiment, weights will be computed in the range from 0 to 1. Assuming that client A sends an offer to client B to trade the item 306 for the item 307, since client A would like to obtain the item 307 and, at the same time, this item is already linked with one of his Wants 300, the link 305 will be updated with a higher weight resulting from client A's offer. In one embodiment, the weight may be modified in increments or, in another embodiment, the weight may be set to 1. If client B accepts the offer, similarly, the weight of link 304 will be increased. However, if the client B rejects the offer, the weight of the link 304 will be decreased. In one embodiment, the weight may be incrementally decreased, while in another embodiment, the weight may be set to 0. It may be that in multi-party trades, the modifications will stay in effect even if the trade does not go through (for example, if it was rejected by other users).

Figure 4:
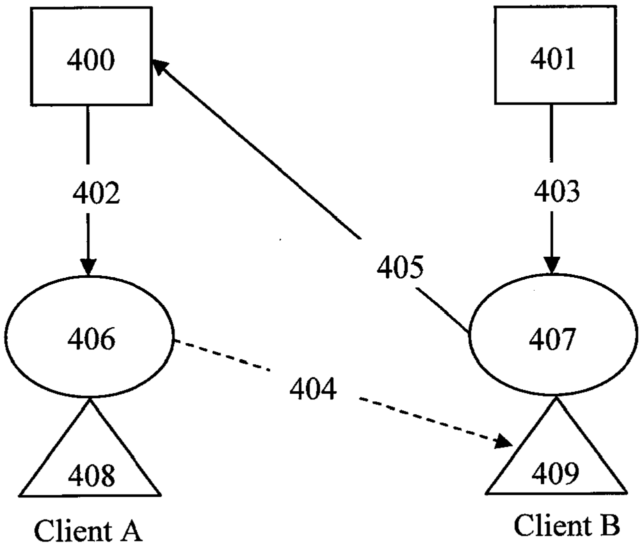
FIG. 4 is a diagram showing a "Match Boost" feature B in accordance with the invention.

FIG. 4 depicts another example of the "Match Boost" feature. Client A has one item available for trade 406 and one wanted item 400. Client B has one item available for trade 407 and one wanted item 401. The items 408 and 409 depict "virtual" items that are appended and linked to every item available by virtual links with a weight equal to one. The link 402 connects client A's items while the link 403 connects client B's items. The item transfer 405 does not complete the "trading circle". The weight of the link 405 depends on the "similarity" of the description of items 407 and 400. In a preferred embodiment, the weight will be computed in the range from 0 to 1. Assume now that client A sends an offer to client B to trade the item 406 for the item 407. Since client A would like to obtain the item 407 and, at the same time, this item is already linked with one of his Wants 400, the link 405 will be updated with a higher weight resulting from client A's offer. In one embodiment, the weight may be modified in increments or, in another embodiment, the weight may be set to 1. At the same time, a virtual link 404 will be created between client A's item 406 and the virtual item 409 and assigned a weight in the range between 0 to 1; in one embodiment the link weight may be assigned equal to 1. The new virtual link 404 will form a "trading circle" and will be also used for computation of other trading matches in the matching subsystem. If client B accepts the offer, similarly, the weight of link 404 will be increased. However, if the client B rejects the offer, the weight of link 404 will be decreased. In one embodiment, the weight may be incrementally decreased, while in another embodiment the weight may be set to 0.

Figure 5:
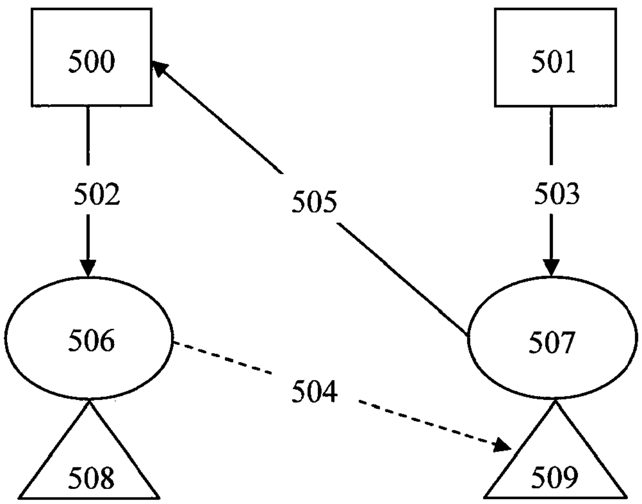
FIG. 5 is a diagram showing a "Match Boost" feature C in accordance with the invention.

FIG. 5 depicts yet another example of "Match Boost" feature. Client A has one item available for trade 506 and one wanted item 500. Client B has one item available for trade 507 and one wanted item in trade 501. The items 508 and 509 depict "virtual" items that are appended and linked to every item available by virtual link with a weight equal to one. The link 502 connects client A's items while the link 503 connects client B's items. The item transfer 505 does not complete the "trading circle". The weight of the link 505 depends on the "similarity" of the description of items 507 and 500. In a preferred embodiment, the weight will be computed in the range from 0 to 1. Assuming that client B sends an offer to client A to trade the item 506 for the item 507, since the client B would like to obtain the item 506 and this item is not linked with one of his Wants, a virtual link will be created between client A's item 506 and virtual item 509 and assigned a weight in the range between 0 to 1. In one embodiment, the weight of the link may be assigned equal to 1. The new virtual link 504 will form a "trading circle" and will be also used for computation of other trading matches in the matching subsystem. If client A accepts the offer, the weight of the link 505 will be increased. However, if client A rejects the offer, the weight of the link 505 will be decreased. In one embodiment, the weight may be incrementally increased or decreased, while in another embodiment, the weight may be set to 1 or 0.

Figure 6:
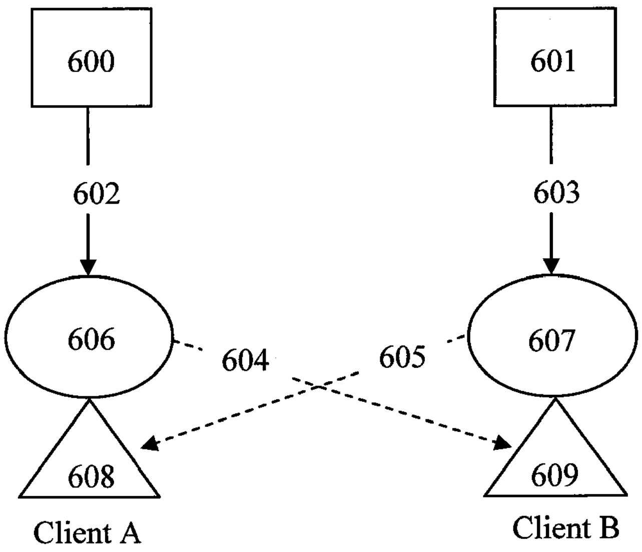
FIG. 6 is a diagram showing a "Match Boost" feature D in accordance with the invention.

FIG. 6 depicts yet another diagram of an example of the "Match Boost" feature. Client A has one item available for trade 606 and one wanted item 600. Client B has one item available for trade 607 and one wanted item 601. The items 608 and 609 depict "virtual" items that are appended and linked to every item available by virtual link with a weight equal to one. The link 602 connects client A's items while the link 603 connects client B's items. There are no item transfers. Assuming that client A sends an offer to the client B to trade item 606 for item 607, since client A would like to obtain the item 607, a virtual link will be created between client A's item 606 and virtual item 609 and assigned a weight in the range between 0 to 1. Similarly, the virtual link will be created between client B's item 607 and client A's virtual item 608. In one embodiment, the weight of the links may be equal to 1, although the weight of the links may differ and be in the range between 0 to 1. In a preferred embodiment, the weight of the link 605 is higher than the weight of the link 604. The new virtual links 604 and 605 will form a "trading circle" and will be also used for computation of other trading matches in the matching subsystem. If client B accepts the offer, the weight of the link 604 will be increased. However, if client B rejects the offer, the weight of the link 604 will be decreased. In one embodiment, the weight may be incrementally increased or decreased, while in another embodiment, the weight may be set to 1 or 0.

As described above, the "Match Boost" feature dynamically modify links and item transfers between individual items thus creating new trading circles or matches. Each time the client sends a trade offer, a new link may connect "virtual" Want and Have items to indicate the client is interested in trading for that specific item the other client owns. This way, the number of actual item transfers increases as clients send more trade offers. In one embodiment, for a trade offer initiated by the client, a new barter listing can be automatically created.

[The System]

The foregoing features may be implemented by one or more computer programs, each resident on a computer or server connected to the communications network or Internet. The computer program would be arranged to present various web pages with options to the clients and provide the clients with the capabilities described above to enable a search for potential "matches" over the Internet, and actualization of two-party and/or multi-party trades.

Specifically, the computer program would be capable of:

maintaining a list of descriptions of items available for trade in a current database;

enabling parties to access the current database to browse and search the descriptions using a communications network;

enabling each party to create links between two or more items, at least one of which has a description in the current database, indicating a desire to trade at least one available item of the link for at least one wanted item of the link; and analyzing the created links to determine the presence of potential barter trades. Each potential barter trade in multi-party trade would involve a plurality of links wherein each party involved in the potential barter trade provides an available item included in one of the links and receives a wanted item included in one of the links, although not necessarily the same link. Thereafter, the computer program notifies each party involved in the potential barter trade of the possibility of actualizing the barter trade and enables the notified parties to confirm or reject the barter trade.

To facilitate the creation of descriptions, the computer program can maintain a list of descriptions of items previously traded or offered for trade in an archive database and enable each party to create descriptions of available items and wanted items for inclusion in the current database using a search or query of at least one of the current database and the archive database.

To facilitate the creation of links, the computer program may be arranged to determine a similarity measure between available and wanted items included in links and consider a potential barter trade to be present when the similarity measure is above a threshold. In one embodiment, the similarity measure may be computed using natural language algorithms. In this case, descriptions of items in different languages must be translated to single language to aid computation of the similarity measure. The similarity measure may be determined by the computer program on-line or when the parties are off-line, i.e., not using the communications network, and the computer program arranged to notify the parties once they log-in to the system.

The foregoing trading features may be implemented by a computer program resident on a computer or server connected to the communications network or Internet. The computer program would be arranged to present various web pages with options to the clients and provide the clients with the capabilities described above to barter items over the Internet.

Specifically, the computer program would be capable of generating a web page which allows clients to browse an inventory for items available submitted by others, i.e., the inventory being maintained in a database 112 (see FIG. 1), and browse and modify a list of items they want. Browsing may be enabled using keywords or other known searching techniques. The computer program would also be arranged to present a web page, which enables clients to post an item for trade using any of the features described above. After posting an item for trade, the computer program enables clients to search through the database 112 in order to find a suitable trade manually using matching options such as searching what other clients have, searching what other clients want, searching by a "Have" list which means that the client looks to see what he can get for his item(s), searching a "Want" list which means that the client looks to see what he needs to have to get what he wants, "Instant Match" which enables identification of a match between what the client has and wants whether involving only one additional client or two or more additional clients, matching for "Smart Pick" or for "Incomplete Match" using "Instant Match" or "Match Surf" features. In a preferred embodiment, the "Match Boost" feature will enable clients to create custom links between items they "Have" and other clients "Want" or between item they "Want" and other clients "Have".

To provide features described above, a barter engine is formed which is a program or collection of programs that executes on a server system. The barter engine preferably executes in real time (although batch execution is also a possibility) and searches for single or multi-party matches to identify completed (circular) or uncompleted (open) potential trades between items offered and items to be acquired. Barter connections (e.g., links) between two items are formed and each connection is assigned a weight according to the likeness of the match. When an exact match is not found, the barter engine tries to match sub-categories and categories, even though the likeness of a match in this case decreases. A "trading circle" is formed as a shortest one-way route originating at one node and ending at the same node. Loops may consist of more than two items, for example in three-way match, three traders are involved. The shortest route with the highest "cumulative or aggregate similarity" represents a best match.

The barter engine may comprise of two separate processors, a barter processor (application server/processor 114) and a match processor (application server/processor 116). Barter processor executes as a natural language processing subsystem that may be a computer program resident in the server 100 and run by barter processor 114 having an interface to one or more application processors 111. The barter processor 114 may be connected to database 115 and used for keyword and advanced search. Keyword and advanced search web page allows clients to search by keyword, category, and category attributes from a single web page.

The "Instant Match" subsystem may be a computer program resident in the server 100 and run by the match processor 116. The match processor may be connected to database 117. The database 117 may be used to store proprietary data relating to the state of nodes, vertexes and edges. The Instant Match interface will allow clients (preferably using a simple one click) to ascertain what they can get for what they have or what they need to get in order to be able to get what they want, match items in real time for possible barter exchange and/or generate trade requests to initiate trades. The computer program will implement this Instant Match feature as an intelligent matching search engine running on match processor 116, which is capable of distinguishing between searches for items having similar but slightly different names, such as "parada boots" and "prada handbag". However, if no items are found with the exact match for a searched term or phrase, the computer program may suggest to the client either to broaden the search or offer "smart picks" from a broad category or less broad sub-category.

The "Smart Pick" option described above is implemented by the computer program that will apply one or more match algorithms as a default sorting mechanism for Instant Match. This feature can also be used at the item detail page so that immediately after a client adds a new item, an item detail page will show a number of smart picks the system selected as possible trades.

The "Incomplete Match" option described above is implemented by the computer program to suggest one or more potential trades for an item the client has or for an item client wants. Incomplete Match uses the same algorithms as a default Instant Match with an exception to traversing from either node 1401L or 1401R, but not both.

The "Match Surf" option described above is implemented by the computer program to suggest one or more close matches based on a client temporarily selecting/de-selecting links between items he has and items he wants. The computer program will apply the same one or more algorithms as applicable for Instant Match.

The "Match Boost" option described above is implemented by the computer program to suggest one or more close matches based on a client's past behavior, feedback, his Wants, and/or his Haves. The program will permanently add, modify, and/or delete links between items belonging to distinct clients. The links will then function in a way similar to Instant Match. The computer program will apply the same one or more algorithms as applicable for Instant Match.

Referring back to FIG. 1, the process for using a computer program via a terminal connected via the Internet to a server on which the computer program is running first requires the client to access the website 110. The client is presented with a web pages 113 including to web pages register, log-in, search, browse, and manage client's profile.

Otherwise, the client is presented with options for matching items (in any of the ways described above) and selects an action to be performed. If the client matches items, he receives a list of matching items and is provided with the ability to search within, filter and/or order the matching results. More specifically, the client can filter by listings, wanted items, classifieds or combinations thereof, perform a keyword search within the results, and/or reorder the results by listed date, price range, distance from a trader's location, and/or other parameters. The client can create a trade offer and then complete the trade.

Several computer programs resident on computer-readable media may be used in the invention. In the context of this document, computer-readable media or medium could be any means that can contain, store, communicate, propagate or transmit a program for use by or in connection with the method, system, apparatus or device. The computer-readable medium can be, but is not limited to (not an exhaustive list), electronic, magnetic, optical, electromagnetic, infrared, or semi-conductor propagation medium. The medium can also be (not an exhaustive list) an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The medium can also be paper or other suitable medium upon which a program is printed, as the program can be electronically captured, via for example, optical scanning of the paper or other medium, then compiled, interpreted, or otherwise processed in a suitable manner, if necessary, and then stored in a computer memory. Also, a computer program or data may be transferred to another computer-readable medium by any suitable process such as by scanning the computer-readable medium.

Having described exemplary embodiments of the invention with reference to the accompanying drawings, it will be appreciated that the present invention is not limited to those embodiments, and that various changes and modifications can be effected therein by one of ordinary skill in the art without departing from the scope or spirit of the invention as defined by the appended claims.

The invention claimed is:

1. A method for bartering items between two or more parties using a communications network, comprising:

enabling each of the two or more parties to access a server via the communications network to provide a list of items a respective one of the two or more parties has to trade and a list of items a respective one of the two or more parties wants to obtain, wherein both the list of items the respective one of the two or more parties has to trade and wants to obtain is not limited to items previously listed in the system, at least one directional link for each of the two or more parties relating at least one item to trade of the respective one of the two or more parties and at least one item to obtain of the respective one of the two or more parties, the at least one directional link being indicative of the respective one of the two or more parties' willingness to trade at least one item of the list of items a respective one of the parties has to trade for at least one item of the list of items the respective party wants to obtain, and a description of the items and any conditions for trade of the items;

storing the list of items each respective party has to trade and wants to obtain and the at least one directional link in a matching engine database;

automatically creating, using a processor, directional item transfers indicating the respective party's possibility to acquire items in trades including a trade of a single item for another single item, a trade of a plurality of items for a single item, a trade of a single item for a plurality of items, and a trade of a plurality of items for a plurality of items;

automatically storing the directional item transfers in the matching engine database;

assigning weights to the links that represents a degree of similarity between descriptions of items available for trade and wanted items, a search for possible trades between the parties being conducted in consideration of the weights of the links;

conducting via a matching engine processor, the search for possible trades between the parties using the directional links and directional item transfers represented as closed loops of interconnected directional links and directions item transfers thus avoiding a repetitive and time consuming database search of each recursive step;

notifying the parties involved in each possible trade about the possible trade and requesting approval of the trade; and upon receipt of approval of the trade from each party listed in the possible trade, processing the trade to completion.

2. The method of claim 1, further comprising enabling each party to browse and search within the database for possible trades involving items they have and/or items they want to obtain, and update the database relating to items they have to trade and want to obtain.

3. , The method of claim 1, further comprising:

defining a plurality of nodes, one for each party's item;

associating one of a plurality of different vertexes with each node depending on whether the item is available for trade, related to the item or not related to any item listed;

associating a directional edge between each vertex of an available item and a respective vertex related to the item or not related to any item listed;

forming additional directional edges to interconnect nodes from different parties; and considering the directional edges when conducting the search for possible trades using the processor by determining a route between a vertex of an available item and a vertex related to the item.

4. The method of claim 3, further comprising:

assigning each vertex a specific weight relating to completeness of the item's description;

sorting the routes of the possible trades based on the weights; and displaying the routes based on the weights.

5. The method of claim 1, wherein the step of conducting the search for possible trades between the parties using the links includes searching for instant matches between only two parties having substantially similar or identical links.

6. The method of claim 1, wherein the step of conducting the search for possible trades between the parties using the links includes searching for instant matches between three or more parties to form a trading circle of links between the three or more parties.

7. The method of claim 1, further comprising displaying on a display to a party, potential trades immediately after entry by that party of a listing of an item for trade.

8. The method of claim 1, further comprising displaying on a display to a party, items sought by at least one other party for an item sought by that party after entry by that party of a listing of an item for trade.

9. The method of claim 1, further comprising storing in database, a history of each party's trades and links, the search for possible trades between the parties using the links being conducted in consideration of the parties' trading history.

10. The method of claim 1, further comprising:

storing in database, a history of each party's possible and actual trades and links; and adjusting the weights based on the party's trading history, the search for possible trades between the parties using the links being conducted in consideration of the parties' trading history and the weights of the links.

11. A system for bartering items between two or more parties using a communications network, comprising:

a central server;

at least one network interface;

a plurality of terminals connected to the central server, each through at least one communications network and the at least one network interface;

said central server comprising a web server;

at least one application server/processor; and at least one database, the central server being arranged to:

enable each of the two or more parties to access a server via the communications network to provide a list of items a respective one of the two or more parties has to trade and a list of items a respective one of the two or more parties wants to obtain, wherein both the list of items the respective one of the two or more parties has to trade and wants to obtain is not limited to items previously listed in the system, at least one directional link for each of the two or more parties relating at least one item to trade of the respective one of the two or more parties and at least one item to obtain of the respective one of the two or more parties, the at least one directional link being indicative of the respective one of the two or more parties' willingness to trade at least one item of the list of items a respective one of the parties has to trade for at least one item of the list of items the respective party wants to obtain, and a description of the items and any conditions for trade of the items, store the list of items each respective party has to trade and wants to obtain and the at least one directional link in a matching engine database, automatically create using the at least one application server/processor, directional item transfers indicating the respective party's possibility to acquire items in trades including a trade of a single item for another single item, a trade of a plurality of items for a single item, a trade of a single item for a plurality of items, and a trade of a plurality of items for a plurality of items, automatically store the directional item transfers in the matching engine database, assigning weights to the links that represents a degree of similarity between descriptions of items available for trade and wanted items, the search for possible trades between the parties being conducted in consideration of the weights of the links, conduct a search for possible trades between the parties using the directional links and directional item transfers represented as closed loops of interconnected directional links and directions item transfers thus avoiding a repetitive and time consuming database search of each recursive step;

notify the parties involved in each possible trade about the possible trade and requesting approval of the trade; and upon receipt of approval of the trade from each party listed in the possible trade, process the trade to completion.

12. The system of claim 11, wherein the at least one database contains (i) barter listings with links between items offered in trade and items wanted, (ii) barter offers and their status, and (iii) a barter archive containing all previously posted, but not longer active barter listings, offers, and trades.

13. The system of claim 11, wherein the at least one application server/processor comprises a first application server/processor and a second application server/processor and the at least one database comprises a first database associated with the first application server/processor and a second database associated with the second application server/processor, said first application server/processor being arranged to determine a degree of similarity between items associated with the links, the second application server/processor being arranged to identify possible barter transactions based the links with associated degree of similarity.

14. The system of claim 13, wherein the first application server/processor is arranged to assign weights to the links representing the degree of similarity between items associated with the links, and the second application server/processor is arranged to consider the weights of the links when determining possible barter transactions.

15. The system of claim 11, wherein the central server is arranged to search for possible trades between the parties using the links by searching for instant matches between only two parties having substantially similar or identical links.

16. The system of claim 11, wherein the central server is arranged to search for possible trades between the parties using the links by searching for instant matches between three or more parties to form a trading circle of links between the three or more parties.

17. The system of claim 11, wherein the at least one database further includes a history of each party's trades, the central server being arranged to search for possible trades between the parties using the links in consideration of the parties' trading history.

18. The system of claim 11, wherein the central server is further arranged to:

define a plurality of nodes, one for each party's item;

associate one of a plurality of different vertexes with each node depending on whether the item is available for trade, related to the item or not related to any item listed;

associate a directional edge between each vertex of an available item and a respective vertex related to the item or not related to any item listed;

form additional directional edges to interconnect nodes from different parties; and consider the directional edges when determining a possible trade by determining a route between a vertex of an available item and a vertex related to the item.

19. The system of claim 18, wherein the central server is further arranged to:

assign each vertex a specific weight relating to completeness of the item's description;

sort the routes of the possible trades based on the weights; and display the routes based on the weights.

* * * * *